United States Patent Office 2,700,128
Patented Jan. 18, 1955

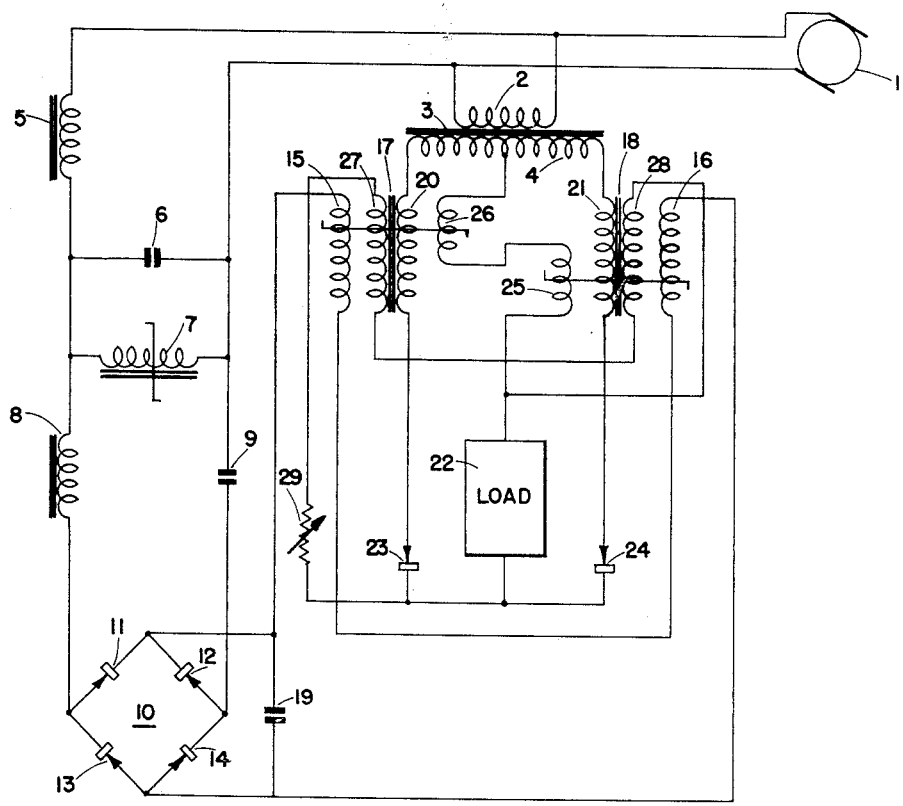

2,700,128

MAGNETIC VOLTAGE REGULATOR

Hugo H. Woerdemann, Whittier, Calif., assignor to North American Aviation, Inc.

Application May 5, 1952, Serial No. 286,063

4 Claims. (Cl. 323—66)

This invention relates to alternating current generators, and particularly to a device for automatically regulating the output voltage of an alternating current source as applied to a load despite variations in the output voltage of the source or variations in the load. The invention is also particularly pertinent to the regulation of static A. C.-D. C. converters such as those which employ low voltage-high current selenium rectifiers.

The voltage applied to a power-consuming device is dependent upon the line voltage derived from the power source, and upon the impedance of the load itself. Attempts to keep the voltage applied to the load or power-consuming device constant have, in the past, resulted in devices for comparing the voltage applied to the load with a standard voltage and correcting the output voltage of the current source correspondingly. This invention contemplates a circuit for assuring that a constant voltage is applied to the load despite changes in the frequency or output voltage of the alternating current source, and despite changes in the characteristics of the load itself.

It is an object of this invention to provide an automatic voltage regulating device.

It is another object of this invention to provide means for causing the voltage applied to an electrical load to remain independent of the characteristics of the load and of fluctuations in the voltage and frequency of the power source.

It is another object of this invention to provide a tubeless automatic voltage regulator.

It is another object of this invention to provide an automatic voltage regulator having no moving parts.

Other objects of invention will become apparent from the following description taken in connection with the accompanying single figure which is a schematic diagram of the invention.

Referring to the single figure, an alternating current source 1, such as an alternating current generator, supplies current to primary winding 2 of transformer 3 having a center-tapped secondary winding 4. Power is supplied from generator 1 and also through impedance 5 to capacitor 6 and saturable reactor 7 connected in parallel as shown. The voltage developed across saturable reactor 7 is carried by means of inductor 8 and capacitor 9 to rectifier bridge 10 including rectifiers 11, 12, 13, and 14. The output of rectifier bridge 10 is fed to control windings 15 and 16 of saturable reactors 17 and 18 in series as shown. Capacitor 19 is connected across the output of the rectifier bridge. Load windings 20 and 21 supply current from secondary winding 4 to load 22 through rectifiers 23 and 24, the circuit being completed through saturable reactor windings 25 and 26 to the center tap of transformer secondary winding 4. Saturable reactor control windings 27 and 28 are connected across load 22 by variable resistance 29.

It is required that load 22 be supplied with direct current voltage of a constant average value despite changes in the characteristics of the load and changes in the frequency or voltage output of alternating current source 1. In practice, this load might be an alternator field or the D.-C. output of a power supply. Accordingly, the output voltage of source 1 is supplied through inductor 5 to capacitor 6 and saturable reactor 7 in parallel as shown. Saturable reactor 7 is preferably wound upon a core of 50–50 nickel iron grain-oriented material, and has the characteristic that the voltage drop across it is a function only of the frequency of source 1 and is independent of the voltage supplied by source 1. The voltage of the signal supplied to inductor 8, therefore, is dependent only upon the frequency of source 1, and varies directly with it. However, since the current through inductor 8 is inversely proportional to frequency, it follows that the current through inductor 8 is constant and independent both of the voltage and frequency of source 1. This current is rectified in bridge 10 and supplied to control windings 15 and 16 of saturable reactors 17 and 18 which form a magnetic amplifier. The current through saturable reactor windings 15 and 16 is therefore constant and does not vary either with the frequency or voltage output of source 1. Saturable reactor windings 27 and 28, however, are supplied with a current in response to the voltage drop across load 22, and these windings are arranged so that a subtraction of magnetomotive forces takes place in the amplifier. In other words, windings 27 and 28 are wound so that currents flowing in them produce an opposite effect from currents flowing in windings 15 and 16, and the difference in magnetomotive forces produced by the two sets of control windings controls the flow of control current in windings 20 and 21, which in turn supply current to load 22. The ratio of subtraction may be determined by the value of resistance 29, i. e., the voltage appearing across load 22 may be adjusted by simple adjustment of resistance 29. If the voltage across load 22 increases, the current in windings 27 and 28 chances so as to cause a decrease in the net magnetomotive force in the cores and a consequent decrease in the flow of load current through load 22. Conversely, load current is increased if the voltage drop across load 22 should decrease. The voltage applied to load 22 is therefore maintained at a constant value despite changes in the characteristics of the rectifier and changes of the load such as would ordinarily vary the voltage across the load, and despite changes in voltage or frequency of alternating current source 1. Since the controlling parameters in this invention are forced currents, the device is ideally suited to the use of magnetic amplifiers for the supply of power to the load. Thus no electronic tubes are utilized in the device, and frequent maintenance is not required. In addition, a relatively rugged device capable of use in a variety of ambient conditions is provided. While voltage regulation of A. C.-D. C. converters supplying a relatively high voltage may also be attained by other means than this invention, regulation of the voltage output of a high current-low voltage output converter has in the past been difficult because the percentage regulation required resulted in a very small figure of actual voltage. Thus to regulate the output of a 6 volt A. C.-D. C. converter to one percent requires apparatus capable of sensing .06 volt or less. This device is peculiarly adapted for this purpose because regulation is made to depend principally upon currents rather than upon voltages.

It is to be noted that load current flows through windings 25 and 26 on saturable reactors 18 and 17, respectively. These windings are arranged to aid saturation as provided by forward currents in windings 20 and 21. The effect of windings 25 and 26 is that during one half cycle when current is flowing in a forward direction (toward the load) in winding 21 and current is (theoretically) not allowed to flow through winding 20 by action of rectifier 23, the current flowing in winding 26 completely eliminates the effect of back current flowing through rectifier 23 and winding 20. In the next half cycle a similar effect is produced with reference to windings 21 and 25 and rectifier 24. In other words, by provision of windings 25 and 26 the effect of rectifier back currents in tending to desaturate the reactor cores is eliminated and it is permissible to utilize rectifiers of inferior grade. In addition, since windings 25 and 26 aid saturation the sensitivity of the amplifier is increased.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for applying to an electrical load a voltage independent of the voltage drop across said load and independent of the voltage of the source, comprising a magnetic amplifier having a plurality of control windings and a load winding connected to supply said load with current; means for causing a constant current to flow through one of said control windings; said constant current means comprising a first inductor connected to one terminal of said source, a capacitor and a saturable reactor connected in parallel between the other terminals of said source and said first inductor, a second inductor connected in parallel to said saturable reactor; and means for causing a current proportional to the voltage drop across said load to flow through another of said control windings in the sense required to cause a subtraction of the magnetomotive forces in the saturable reactor cores of said magnetic amplifier to thereby cause the voltage drop across said load to remain constant.

2. Means for applying a constant voltage to a variable electrical load from a source of variable alternating current voltage comprising means supplied by said source for producing a constant current; a magnetic amplifier having control windings and load windings with output connected to said load; means including a first inductor connected to one terminal of said source, a capacitor and a saturable reactor connected in parallel between the other terminals of said source and said first inductor, and a second inductor connected in parallel to said saturable reactor for producing a current proportional to the voltage drop across said load; and means including said control windings for controlling the output of said load windings in response to the difference between said currents.

3. Means for applying a constant voltage to a variable electrical load from a source of variable alternating current voltage, comprising means including a first inductor connected to one terminal of said source, a capacitor and a saturable reactor connected in parallel between the other terminals of said source and said first inductor, and a second inductor connected in parallel to said saturable reactor for producing from said source a constant current; means for producing a current proportional to the voltage drop across said load; and means responsive to the difference between said currents for supplying current to said load to thereby maintain constant the voltage applied to said load.

4. Means for maintaining the voltage applied to an electrical load constant comprising a magnetic amplifier including a source of alternating current, a pair of saturable reactors each having a pair of control windings and a load winding for supplying unidirectional current to said load from said source through rectifiers, a source of constant current connected in series to one control windings of each of said saturable reactors, the remaining control windings being connected in series across said load and arranged to tend to counteract the effect of said constant current control windings, and a pair of additional windings on each of said saturable reactors connected in series with each other and between said load and said source whereby variations in voltage across said load are virtually eliminated despite back currents through said rectifiers.

References Cited in the file of this patent

UNITED STATES PATENTS

| | | |
|---|---|---|
| 2,078,880 | Logan | Apr. 27, 1937 |
| 2,309,156 | Andrews | Jan. 26, 1943 |
| 2,486,250 | Bixby | Oct. 25, 1949 |
| 2,504,675 | Forssell | Apr. 18, 1950 |
| 2,509,865 | Hedstrom et al. | May 30, 1950 |